Oct. 29, 1929.  O. L. OLNEY ET AL  1,733,900

DIRIGIBLE HEADLIGHT

Filed Feb. 17, 1928

O. L. Olney
J. B. Hurley  INVENTOR

BY *Victor J. Evans*
ATTORNEY

WITNESS:

Patented Oct. 29, 1929

1,733,900

UNITED STATES PATENT OFFICE

OSCAR L. OLNEY AND JAMES B. HURLEY, OF LAKE PLACID, NEW YORK, ASSIGNORS TO DIRIGIBLE HEADLIGHT COMPANY, INC., OF LAKE PLACID, NEW YORK, A CORPORATION OF NEW YORK

DIRIGIBLE HEADLIGHT

Application filed February 17, 1928. Serial No. 255,090.

This invention relates to dirigible headlights, and the general object of the invention is to provide a controlling device that is extremely simple in construction, and designed for automatically turning the headlights of a vehicle in a horizontal plane to follow the course of travel of the vehicle, and which can be applied to motor vehicles now in use with no change to the headlights or other parts thereof.

A further object of the invention is to provide a dirigible headlight device for motor vehicles, that is inexpensive to manufacture, easy to apply and is efficient in operation and service.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which.

Figure 1:
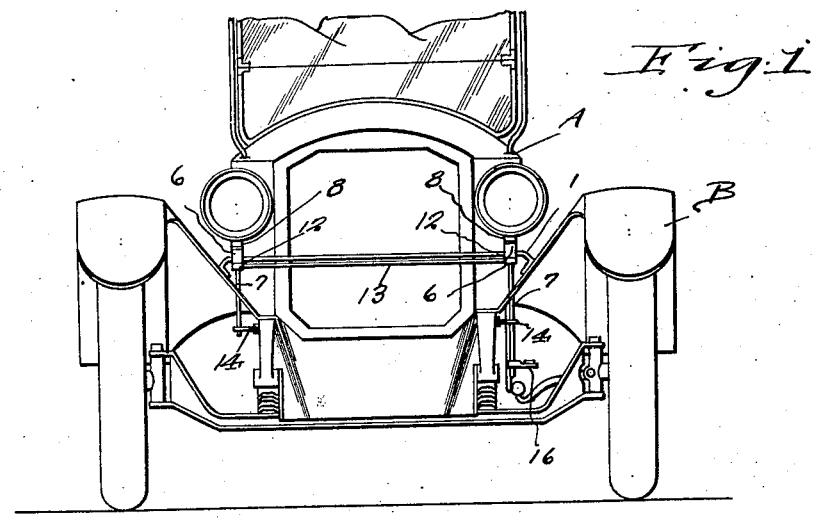
Figure 1 is a front elevation of a vehicle showing the application of the device forming the subject matter of the present invention.

Referring to the drawings in detail, the letter A indicates a motor vehicle, B the front fenders thereof, C the chassis and D the steering arm of the steering mechanism.

In the present invention, it will be noted that use is made of a fender brace in the form of a cross bar which is indicated by the reference numeral 1 and has its ends bent in converging relation with respect to each other and secured to the respective front fenders B as best shown in Figure 1 of the drawings.

Figures 2, 3:
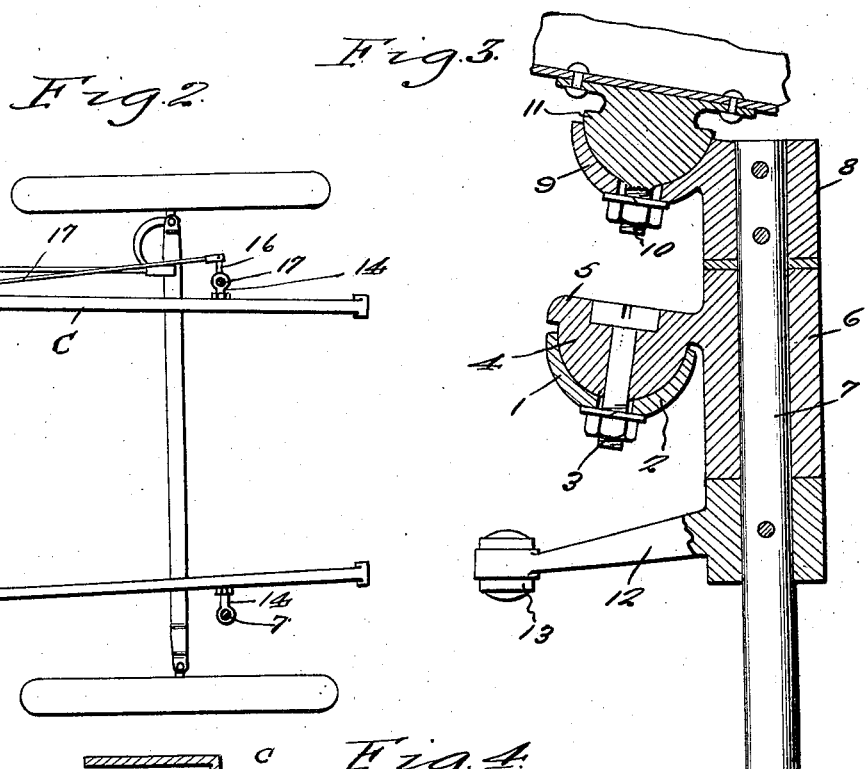
Figure 2 is a horizontal sectional view illustrating the application of parts of the device to the steering mechanism of the vehicle.
Figure 3 is a fragmentary vertical sectional view taken through one of the lamp mountings and adjacent parts.

The fender brace is tubular in formation for a portion of its length and is flattened at the ends thereof with a rounded depression 2 formed adjacent each end as suggested in Figure 3 of the drawings.

Adjustably secured in each of the depressions 2 through the instrumentality of a bolt and nut connection 3 is a semi-spherical knob 4 which is formed with and depends from a projection 5 extending rearwardly at an inclination from a bearing sleeve 6.

The bearing sleeves 6 rotatably receive the lamp posts 7 which have secured to their upper ends a collar 8 formed with a cup shaped member 9 adapted to receive and be secured therein by a nut 10 a semi-spherical knob 11 which has depending therefrom a threaded stud for the purpose of receiving the nut as clearly shown in Figure 3 of the drawings. The knobs 11 are riveted or otherwise secured to the bottom of the headlamps in the usual manner, and due to the fact that the knob 11 is semi-spherical in form and follows the shape of the cup shape member 9, it will be apparent that the headlamp can be adjusted and secured in adjusted position by the nut.

Figure 4:
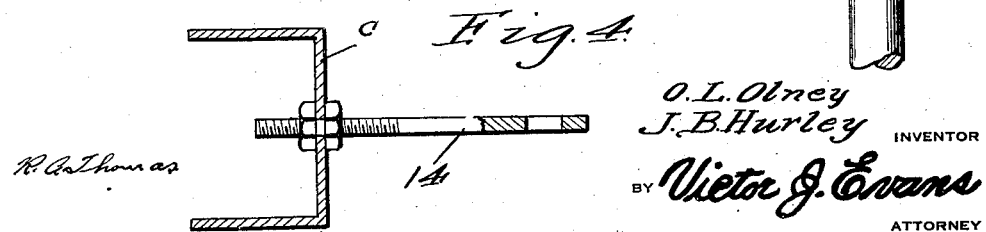
Figure 4 is a sectional view taken through the chassis of the vehicle as shown in Figure 2 and illustrating one of the guides for the lamp posts.

Extending rearwardly from and fixed to each of the lamp posts 7 is an arm 12 which terminates at its outer end in a bearing for pivotally receiving the ends of a cross rod 13 whereby upon movement of one of the lamp posts, the other lamp post will be moved in unison therewith. The lamp posts are held against lateral movement by fingers 14 which are provided with openings to accommodate the lower ends of the lamp post for rotation therein as best shown in Figure 1 of the drawings. The fingers 14 are threaded and pass through the channel bars of the chassis as best shown in Figure 4 and held secured thereto by nuts 15.

One of the lamp posts is considerably longer than the other and has secured to its lower end a lateral disposed link 16 which has pivotally secured to its outer end one end of a link 17 while the opposite end of said link 17 is secured to the steering arm D, as best shown in Figure 2.

From the above description and disclosure of the drawings, it will be obvious that when the steering mechanism of the vehicle is moved, the lamps will be moved accordingly and the device can be easily and quickly applied to a vehicle with little or no changes thereto and with very little effort.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:

A dirigible headlight device of the character described comprising a cross bar tubular in formation and being provided with flat ends secured to the fenders of a vehicle, with rounded depressions formed therein, lamp posts, a bearing for each lamp post and receiving the same for rotation, a projection extending rearwardly at an inclination from each bearing, a semi-spherical knob depending from the projections and the knobs of the projections being adjustably secured in the depressions, means for detachably and adjustably securing headlamps to the upper ends of the lamp posts and each of said means including a collar fixed to a post, a cup-shaped member disposed above and in alignment with a rounded depression, a semi-spherical knob arranged in said depression, a threaded stud depending from the last mentioned knob and passing through the cup-shaped member, a nut threaded on said stud, arms secured to the lamp posts and extending rearwardly therefrom, a cross rod pivotally secured to said arms, and means connected with one of said lamp posts and the steering mechanism of a vehicle for moving the lamps in unison upon movement of the steering mechanism.

In testimony whereof we affix our signatures.

OSCAR L. OLNEY.
JAMES B. HURLEY.